Nov. 14, 1961     K. O. LANGE     3,008,239
CONSTANT PRESSURE CALIPERS
Filed May 16, 1960     2 Sheets-Sheet 1
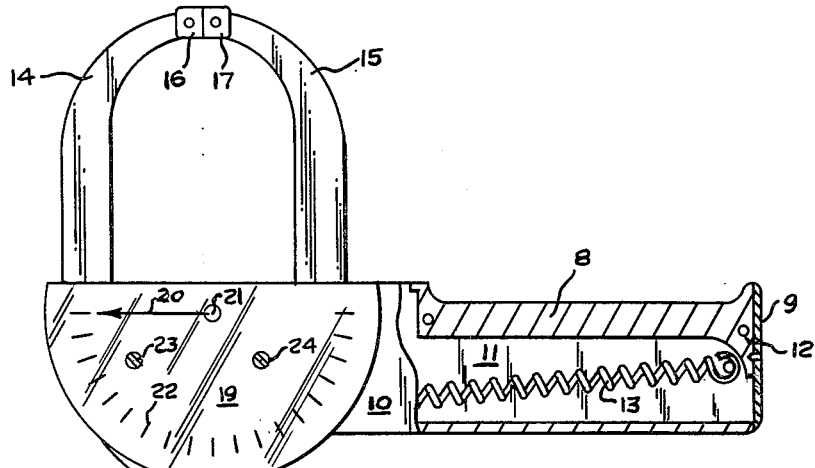
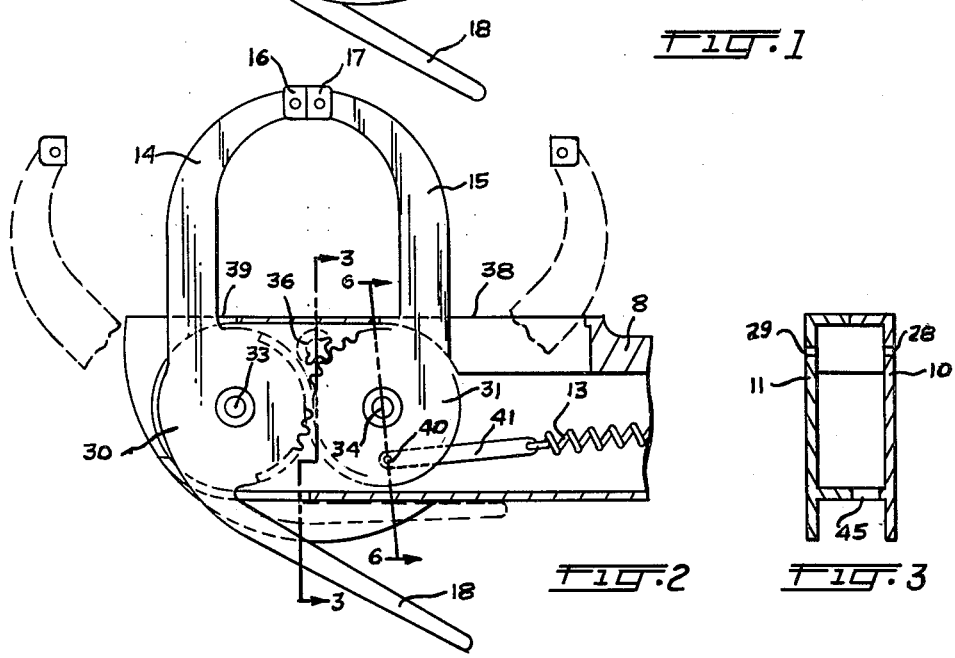
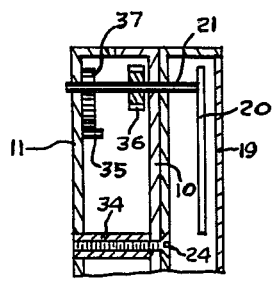
INVENTOR.
KARL O. LANGE
BY W. E. Sherwood
Attorney

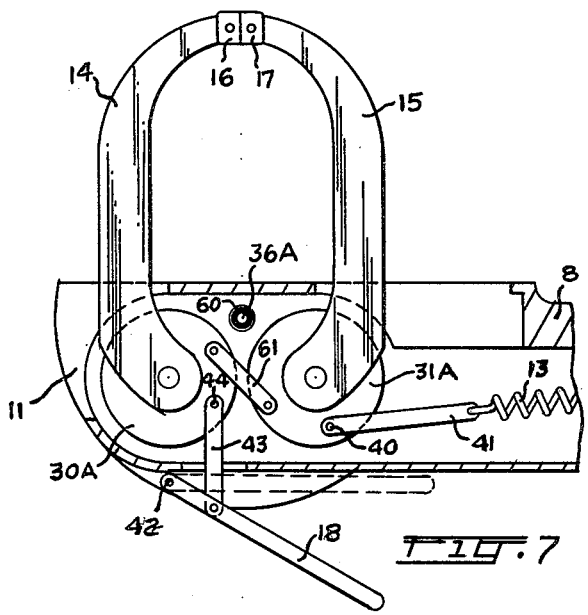
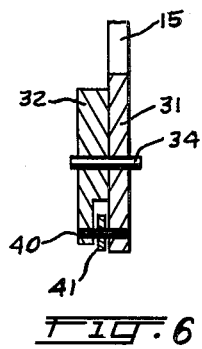
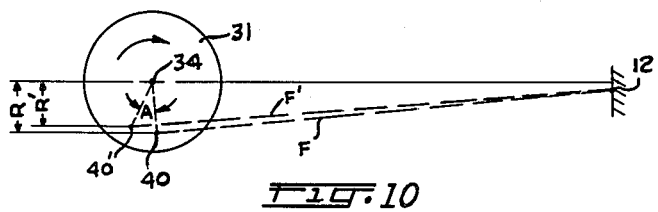
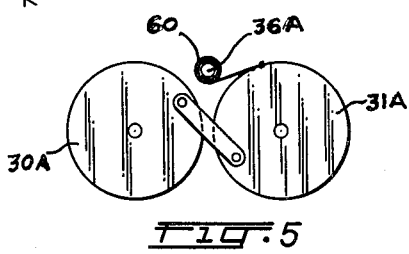
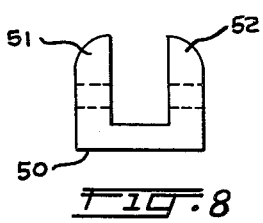
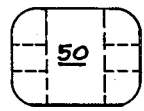

United States Patent Office 3,008,239
Patented Nov. 14, 1961

3,008,239
CONSTANT PRESSURE CALIPERS
Karl O. Lange, Richmond Road, Lexington, Ky.
Filed May 16, 1960, Ser. No. 29,518
7 Claims. (Cl. 33—149)

This invention relates to an improved construction of calipers and more particularly to calipers whose jaws apply a substantially constant pressure at all times to the surfaces of the object under measurement.

For purposes of illustration, the invention is especially well qualified for use in the measuring of skin-folds, although it is in no way intended to be limited to that sole usage. A requirement has long existed for calipers useful in skin-fold measuring, but, so far as I am aware, all means heretofore used in such measuring have possessed certain disadvantages which it is a purpose of the invention to overcome. For example, the comparative measurements of the thickness of the skin-fold, as between a plurality of measurements made by the physician upon a given person or against a prescribed standard, requires that standard conditions obtain at all times. The fold of skin not only is resilient, but also may vary materially in thickness; the skin must not be injured by the measuring operation although the calipers must have a firm grip upon that skin; and the calipers must be capable of ready operation and repeated usage without tedious recalibration. As an illustration of the international standard under consideration by physicians for use in skin-fold measurements of the human body, a constant contact pressure of the caliper jaws of 10 grams per square millimeter of jaw surface is required. In addition, these jaws must employ a standard sized contact surface and an appreciable range of spread of the jaws.

It is an object of this invention to provide a caliper means for applying a substantially constant pressure to the surfaces of the object under measurement.

Another object is to provide a caliper means having manually operable means for opening the jaws of the calipers.

A further object is to provide a constant pressure caliper means having an improved dial indicator in combination therewith.

A still further object is to provide a caliper means having simultaneously movable caliper arms thereon.

Other objects and advantages of the invention will become more apparent as the description proceeds and when considered in conjunction with the accompanying drawings in which:

FIG. 1 is a side elevation view of the assembled caliper means with part of the housing portion broken away.

FIG. 2 is a side elevation view of one form of a caliper means embodying the inveniton with one side of the housing removed and with part of the handle portion broken away;

FIG. 3 is a sectional view of the respective assembled housing portions taken on line 3—3 of FIG. 2 and with the movable portions of the calipers removed;

FIG. 4 is a sectional view with parts broken away of the dial indicator rotor taken on line 3—3 of FIG. 2 and showing the mounting of the indicator cover on the housing.

FIG. 5 is a side elevation view of a second form of dial indicator rotor;

FIG. 6 is a sectional view of the second rotatable member taken along line 6—6 of FIG. 2;

FIG. 7 is a side elevation view of a second form of caliper means embodying the invention with one side of the housing removed and with part of the handle portion broken away;

FIG. 8 is a top plan view of one caliper jaw to a larger scale;

FIG. 9 is a face view of the jaw shown in FIG. 8, and

FIG. 10 is a diagrammatic view of the forces applied by the spring acting through its effective lever arms.

In accordance with the invention a housing having a handle portion, and with a manually operable lever supported as a part of a rotatable member, or on the housing, is adapted for manipulation with one hand to open the jaws of a pair of simultaneously movable caliper arms. These arms are attached to, or form a part of the respective rotatable members contained within the housing and are opened by movement of the lever against the reaction of a spring also contained within that housing, the movement of the rotatable members also actuating the pointer of a dial indicator attached to a side of, or forming a part of, that housing. The arrangement of the structure is such that, within the customarily employed measuring range of the calipers, a substantially constant torque is applied to the caliper arms so that the caliper jaws will exert a substantially constant pressure against the surfaces of the object being measured.

Referring now to FIG. 1, an elongated housing formed of hollow mating front and rear plates 10 and 11 is provided at one end with a relatively massive insert 8 to which these plates may be attached as by screws and to which an end cover plate 9 likewise may be attached. The insert contains an anchor portion 12 to which one end of spring 13 is attached and against which portion that spring exerts a reaction at all times. Extending from slots in the upper edge of the housing adjacent its other end is a pair of caliper arms 14 and 15 curved to embrace a substantial volume of an object to be measured, such as a fold of skin of an obese person. The caliper arms have pivoted jaws 16 and 17 of desired size at the respective outer ends thereof. Pivotally mounted upon the housing, or attached to rotatable member 30, and projecting from the lower edge of the housing is a manually operable lever 18 arranged for engagement by the thumb while the handle portion of the housing is being grasped in the palm of the hand.

A suitable dial indicator including a hollow transparent cover 19 with an indicating arm or pointer 20 movable under that cover and mounted upon an oscillatory shaft 21, preferably is employed in the combination. The shaft 21, later to be described, projects through the front plate 10 and upon that front plate a suitable surface bearing indicia 22 to which the setting of pointer 20 may be related, is provided. The dial indicator cover may conveniently be mounted by means of screws 23 and 24 extending through holes in the front plate 10 and into the ends of fixed axles mounting the rotatable members, next to be described.

Considering now FIG. 2, a pair of rotatable members or discs 30 and 31 having equal diameters and having spacers, one of which is shown at 32 in FIG. 6, attached to the rear sides of the same, are mounted for rotation on fixed axles 33 and 34. These axles are rigidly attached to the rear plate 11 to which also is rigidly secured an inwardly projecting torsion spring abutment 35 (FIG. 4) the purpose of which will later become apparent. By means of friction reducing bushings, the discs rotate upon those axles and in one modification of the invention, each disc is provided on a portion of its periphery with gear teeth adapted to mesh with the teeth on the other disc, and with the teeth on one of said discs meshing with similar teeth on a dial indicator rotor 36 rigidly attached to the shaft 21. Attached at one end to this shaft and at the other end to abutment 35 is a torsion spring 37, such as a watch hair spring, serving to overcome any gear back-lash and to hold the indicating arm in its proper position when the caliper jaws are either in contact with each other, or at a measuring distance apart. Shaft 21 is rotatably supported for oscillatory motion in aligned holes 28 and 29 in the mating front and rear plates of the housing. It will also be understood that each of the axles 33 and 34 likewise is supported between those same plates, but is rigidly attached thereto. Moreover, the space between those plates at the regions where the rotatable discs with attached spacers are located will be substantially filled by those discs and spacers.

The caliper arms are rigidly affixed to the spacers, or to the discs, and extend through open slots 38 and 39 in the upper edge of the housing, such slots having a dimension lengthwise of the housing sufficient to permit the caliper arms to separate by the desired amount, as the discs and spacers are rotated. A suitable maximum separation indicated by the dotted lines in FIG. 2 may, for example, in calipers used for skin-fold measurements, be about 6.5 centimeters and commensurate with a rotation through about 30° for each of those discs. The spacers in addition to providing a convenient means for mounting the caliper arms, also help to reduce the size of the openings communicating the interior and exterior of the housing in the region of the open slots. Moreover, spacer 32 carries a pin 40 serving as a mounting for a pivotal clevis 41 to which the second end of spring 13 is attached and through which it reacts upon the movable discs. The location of this pin serves an important function, as will later be described.

For the purpose of opening the caliper jaws against the action of the spring 13, a handle 18 is provided and may be formed integrally with disc 30, as in FIG. 2, or may conveniently be pivoted at one end upon a pin 42 extending through the lower portions of the side walls out of the path of movement of the disc 30 and its attached spacer, as in FIG. 7. Intermediate the ends of the handle in the latter modification, a link 43 may be pivotally attached at its respective ends to the handle and to a pin 44 projecting from a side face of the disc 30A. A suitable slot 45 (FIG. 3) is provided in the lower part of plate 10 to permit movement of this link, or of handle 18, as the handle moves between the full line and dotted line positions seen in FIGS. 2 and 7. Each of the front and rear plates is held in rigid relation to each other to form an enclosed inner hollow housing space, except for the above-described slot openings. Axles 33 and 34 are rigidly attached to rear plate 11 and the securing of dial indicator cover 19 to those axles by screws 23 and 24 also secures the front plate 10 to those axles. In addition, the securing of each plate to the insert 8 serves to provide a compactly secured, multi-part housing having relatively small openings, thus limiting the spaces through which dust or other extraneous material may enter.

The attachment and the length of the respective caliper arms is such that an equal torque is applied to each arm and the jaws of each arm present an equal surface to the object being measured. A conventional jaw for such arms, as seen in FIGS. 8 and 9 may include a member having a flat surface 50 from which extends a pair of spaced rearward side walls 51 and 52 each having aligned holes through which a pin (not shown) may be inserted to pivotally engage the jaw with the tip of a caliper arm as seen in FIG. 2.

With the foregoing description in mind, reference now is made to FIGS. 1, 2 and 10 wherein the spring 13, shown as a tension spring, exerts a force F upon disc 31 when the caliper jaws are in contact with each other. Due to the interconnection of the disc 31 with disc 30 by means of their gear teeth; to the equal diameters of those discs; and to the equal lengths of the caliper arms; this force F is shared equally by the caliper jaws which are of equal size and a constant pressure is applied by each of those jaw surfaces. At this condition of rest of the calipers, the dial indicator arm 20 points to a minimum standard reading and the angular position of pin 40 is such that the spring is acting with an effective lever arm R pivoted about the axle 34. As will be apparent to those skilled in the art, the spring 13 following Hooke's law will undergo a deformation proportional to the stress applied to it by manual movement of handle 18 as the discs rotate through their interconnections. Also, as disc 31 rotates clockwise during the separation of the caliper arms, the length of the effective lever arm through which the deformed spring, now exerting an increased force $F^1$, can act, will diminish. The invention comprehends, therefore, the employment of a combination of elements so chosen and arranged that throughout substantially the entire range of angular movement of the disc 31 the torque on the caliper arms derived from the product $FR$, or the product $F^1R^1$, on intermediate products between these values of force and effective lever arms, will remain substantially constant. It is realized that, due to certain characteristics inherent in springs, a true linear relation between deformation and stress applied cannot be expected, nor does the geometry of the motion of point 40 exactly compensate such characteristics, but consistent with manufacturing tolerances and when used for skin-fold measuring and equivalent purposes, a wholly satisfactory and reliably calibrated instrument may be produced in accordance with the invention. For example, a satisfactory arrangement results from having the location of pin 40 about 4° counterclockwise from the plane normal to the line passing through axles 33 and 34, as seen in FIG. 10, when the calipers are not in use; the end of the spring attached to spacer 8 being slightly below an extension of that line, as seen in FIG. 1 and a spring being utilized which has a suitable original length and a suitable spring rate.

The operation of the described apparatus will now be apparent. When used in skin-fold measuring for example, the operator with one hand holds the skin and with the other hand actuates lever 18 to separate the caliper jaws which then are engaged behind the edge of the folded skin. The spring 13 reacts against both the end wall 12 and the angularly displaced disc 31 to tend to pull the disc counterclockwise and to pull the companion disc 30 clockwise. Thus, upon release of lever 18, the caliper jaws hold the fold of skin with a pressure commensurate with the above-described torque conditions. Since the force exerted by the spring multiplied by the lever arm will remain approximately the same, regardless of the thickness of the fold of skin embraced by the caliper jaws, a constant pressure therefore is exerted upon the skin surfaces and valuable comparative measurements taken under satisfactorily standard conditions may be secured. Various sizes of springs may be employed provided a suitable pressure consistent with the measuring required results from the spring being used. In measuring skin-folds for example, a firm pressure of about 10 grams per square millimeter of jaw surface is generally employed.

Having thus described a preferred form of the invention, it will be obvious that other equivalent means may be employed without departing from the present teachings. For example, the invention comprehends the use of coil or leaf compression springs rather than tension springs, in which event the location of the point of engagement of the spring with disc 31 or 31A would be suitably modified; or the use of inside calipers for contacting inside surfaces of an object rather than outside surfaces thereof, in which event the caliper jaws would face away from each other rather than toward each other.

Moreover, different arrangements for actuating the dial indicator pointer and for interconnecting the discs may be employed within the scope of the present invention. In FIG. 5, for example, the rotor 36A may form a part of the shaft 21 as shown in FIG. 4 and may consist of a thin flexible tape 60 attached at one end to the shaft 21 and at its other end to a point on the periphery of disc 31A so that as disc 31A turns clockwise the tape is unwound to turn the shaft 21 and as that disc moves counterclockwise the tape is rewound and the shaft 21 is turned backward by action of the torsion spring 37 as seen in FIG. 4.

In lieu of gear teeth on the rotatable discs serving to interconnect the same, other mechanical movements, one of which is seen in FIG. 7, may be used, especially when a rotor for the dial indicator pointer, as seen in FIG. 5, is to be employed. In this modification, disc 30A may be rotated by the link 43 and through a second link 61 of fixed length having its ends pivotally mounted at appropriate points above and below the center lines of the two discs 30A and 31A, both discs may be rotated simultaneously and in opposite angular directions.

It will be understood that both in the forms shown in FIGS. 2 and 7 an angular rotation of each rotatable member of not more than about 30°, as represented by angle A in FIG. 10, is required for separating the caliper jaws to their maximum extent and that such a separation is feasible with the link 61 shown in FIG. 7.

Various other modifications may also be resorted to without departing from the spirit and scope of the invention and it is intended by the appended claims to cover such modifications as fall within the scope of such claims.

What is claimed is:

1. Caliper means for applying a substantially constant pressure to the surfaces of an object being measured and comprising, a housing, a first rotatable member mounted upon said housing and having a first caliper arm attached thereto, a second rotatable member including a lever arm portion and mounted upon said housing and having a second caliper arm attached thereto, means interconnecting said rotatable members for moving the same simultaneously thereby to separate and to bring toward each other said caliper arms depending upon the direction of rotation of said members, a spring having a first end mounted for reaction against said housing and a second end mounted upon said lever arm portion of said second member at a point effecting a generally diminished length of lever arm as the reaction of said spring increases and a generally increased length of lever arm as the reaction of said spring diminishes thereby to provide a torque upon said caliper arms as said first and second rotatable members are moved to different positions, said torque being effective to cause said caliper arms to exert a substantially constant pressure upon said object, and manually operable means attached to at least one of said rotatable members for moving said members against the reaction of said spring.

2. A caliper means as defined in claim 1 wherein said means for interconnecting said members comprises intermeshing gear teeth on the respective said members.

3. A caliper means as defined in claim 1 wherein said means for interconnecting said members comprises a link of fixed length pivotally attached at its ends to the respective said members.

4. Caliper means for simultaneously indicating a measurement and applying a substantially constant measuring pressure against an object being measured and comprising, a housing, a first rotatable member mounted upon the housing and having a first caliper arm attached thereto, a second rotatable member including a lever arm portion and mounted upon said housing and having a second caliper arm attached thereto, means interconnecting said rotatable members for moving the same simultaneously thereby to separate and to bring toward each other said caliper arms depending upon the direction of rotation of said members, a dial indicator mounted upon said housing and having an oscillatory shaft including an indicating arm attached to said shaft, means connecting said shaft to at least one of said rotatable members for moving said shaft in one direction as the member to which said shaft is attached moves in one direction, means connected to said shaft for moving said shaft in an opposite direction independently of the movement in its opposite direction of the member to which said shaft is connected, a spring having a first end mounted for reaction against said housing and a second end mounted upon said lever arm portion of said second member at a point effecting a generally diminished length of lever arm as the reaction of the spring increases and a generally increased length of lever arm as the reaction of said spring diminishes thereby to provide a torque upon said caliper arms as said first and second members are moved to different positions, said torque being effective to cause said caliper arms to exert a substantially constant pressure upon said object, and manually operable means attached to at least one of said rotatable members for moving said members against the reaction of said spring.

5. Caliper means as defined in claim 4 wherein said means for interconnecting said members comprises intermeshing gear teeth on the respective said members and said means for connecting said oscillatory shaft to said one of said members comprises gear teeth intermeshing with gear teeth on said one of said members.

6. Caliper means as defined in claim 4 wherein said rotatable members are journalled for rotation upon stationary axles rigidly mounted upon said housing and said dial indicator includes a cover defining an enclosed space within which said indicating arm may travel, said cover being rigidly mounted upon one end of at least one of said stationary axles.

7. In a measuring device having a caliper means for simultaneously measuring a distance between two surfaces while applying a substantially constant measuring pressure against said surfaces, the combination comprising a first caliper arm mounted upon a first rotatable member, a second caliper arm mounted upon a second rotatable member and adapted to cooperate with said first arm in effecting a measurement of said distance, a housing enclosing said rotatable members, a tension spring anchored at one end to said housing and at a second end to said second member at a point on a radius of said second member spaced from the center thereof sufficient to form a lever arm through which said spring applies a leverage normally holding said arms at a minimum measuring distance apart, and means for rotating said members simultaneously in opposite angular directions thereby to separate said caliper arms against an increased tension of said spring, said spring having a mounting at its said second end upon said second member serving progressively to decrease the effective leverage of said spring as the tension of said spring is correspondingly increased by rotation of said second member during separation of said caliper arms to the required spread of said arms.

References Cited in the file of this patent

UNITED STATES PATENTS

| | | |
|---|---|---|
| 1,317,708 | Kaplan | Oct. 7, 1919 |
| 1,801,270 | Gray et al. | Apr. 21, 1931 |